United States Patent [19]

Brown

[11] 3,993,403
[45] Nov. 23, 1976

[54] INSULATED FITTING SHEATH FOR EYEGLASS TEMPLES

[76] Inventor: Roderick B. Brown, 820 Thompson Ravine Road, Mankato, Minn. 56001

[22] Filed: Apr. 4, 1975

[21] Appl. No.: 565,220

[52] U.S. Cl. .............................. 351/178; 351/122; 351/158
[51] Int. Cl.² ........................................ G02C 5/14
[58] Field of Search .................. 351/122, 158, 178; 252/62

[56] References Cited
UNITED STATES PATENTS

| | | | |
|---|---|---|---|
| 159,452 | 2/1875 | Riker | 252/62 |
| 2,092,815 | 9/1937 | Shaw | 252/62 X |
| 2,214,358 | 9/1940 | Williams | 252/62 X |
| 2,436,101 | 2/1948 | Dirlam et al. | 351/122 |
| 3,140,390 | 7/1964 | Smith et al. | 351/41 X |

*Primary Examiner*—Paul A. Sacher
*Attorney, Agent, or Firm*—H. Dale Palmatier

[57] ABSTRACT

Protective, removable, flexible insulated sheaths are employed on heat-softened temples of eyeglasses during fitting of the glasses to the head of the wearer to prevent injury or discomfort to the wearer. The temples are allowed to cool and harden while held in position on the head.

4 Claims, 7 Drawing Figures

U.S. Patent  Nov. 23, 1976  3,993,403
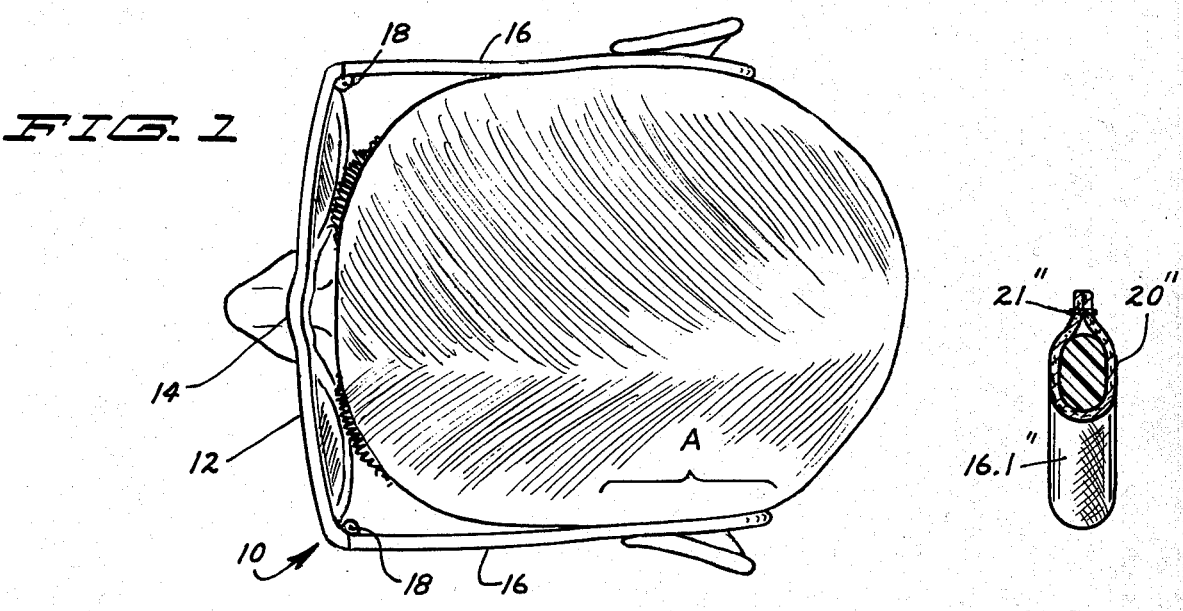
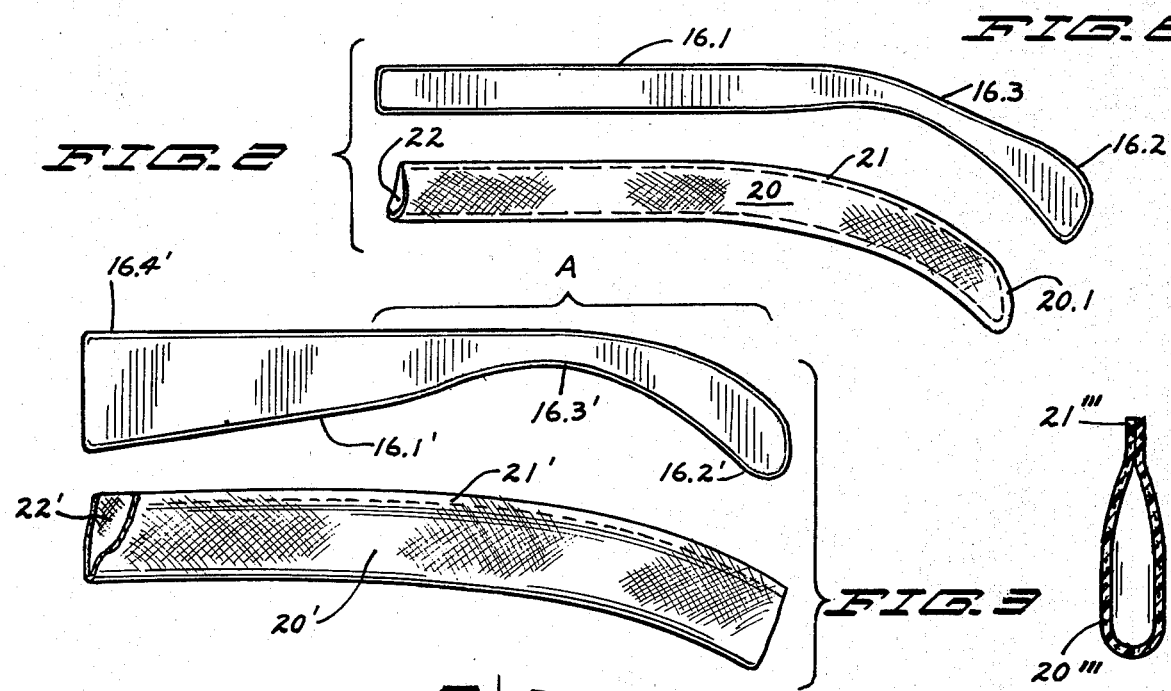
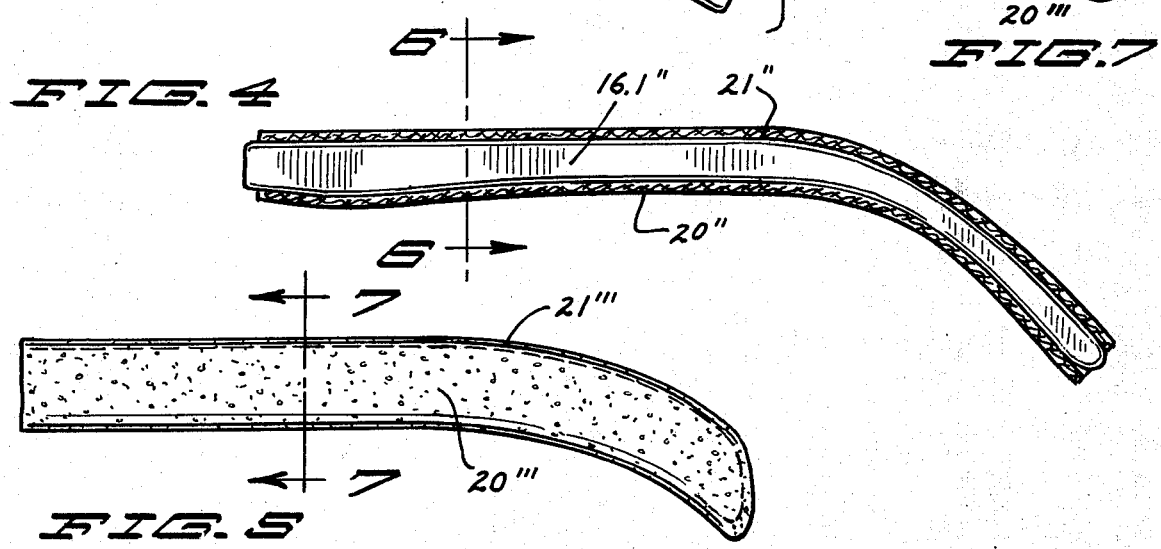

INSULATED FITTING SHEATH FOR EYEGLASS TEMPLES

BACKGROUND OF THE INVENTION

The fitting of the temples of eyeglasses to the head of a wearer has long been a complicated and involved procedure. With eyeglasses having metal temples, or plastic temples with metal cores, the glasses are often fitted by trial and error methods in which the temples are bent slightly with a pliers, fitted to the wearer's head and the errors in fitting noted, bent again with pliers, again fitted to the wearer's head, and so on until an acceptable fit is realized. When temples made entirely of a heat softenable plastic are to be fitted to the head, the temple sections must be first heated in a stream of hot air or the like to a temperature above the softening point, and then may be bent appropriately and held in the bent condition until the temples have cooled below the softening point. Attempts have been made to heat soften the temples of such glasses and then to mold the heated temple portions to the head of the wearer, but this often proves to be a highly painful experience for the wearer because of the heat of the temple sections against the sensitive skin adjacent the ear. With the advent of a plastic which softens at a temperature of about 180° F., the heat-softened temples can be molded to the head of the wearer only with great pain and discomfort. However, since the skin and subcutaneous tissues adjacent the ear are very sensitive to pressure, it is of paramount importance that temples made of plastic or other materials be very closely and carefully fitted to the contours of the head in the vicinity of the ear to avoid painful concentrations of pressure at particular points.

A method of conforming heat-softened eyeglass temples to the head of a wearer without significant pain or discomfort so that a substantially perfect fit can be obtained is much to be desired.

SUMMARY OF THE INVENTION

The invention relates to flexible, elastic insulating sheaths conformable to and received snuggly about end portions of heat-softenable temples of eyelgasses. In the method of the invention, eyeglasses are fitted closely to the head by first heating to the softening point the heat-softenable temples at points where bending is desired, encasing the heated temple portions in insulating, elastic, flexible, snuggly-fitting sheaths, placing the glasses on the head of the wearer, conforming the sheathed, heat-softened portions of the temples to the wearer's head, and maintaining the heat-softened portions in conformance with the wearer's head until the heated portions cool to temperatures below the softening point, whereupon the glasses may be removed from the wearer's head and the sheaths removed.

BRIEF DESCRIPTION OF THE DRAWING

FIG. 1 is a view from above of a person's head, showing eyeglasses in place with the posterior portions of the eyeglass temples conformed closely to the wearer's head;

FIGS. 2 and 3 depict different styles of eyeglass temples, together with suitable insulating sleeves for use therewith in the method of the invention;

FIG. 4 is a side view of an eyeglass temple encased in a protective sheath, the latter being shown in cross section;

FIG. 5 is a cross-sectional side view of a preferred insulating sheath of the invention;

FIG. 6 is a cross-sectional view taken along line 6—6 of FIG. 4; and

FIG. 7 is a cross-sectional view taken along line 7—7 of FIG. 5.

DETAILED DESCRIPTION OF THE PREFERRED EMBODIMENT

With reference to FIG. 1, eyeglasses shaped in accordance with the present invention are designated generally as 10 and include a front, lens holding portion 12, a nose bridge 14, and rearwardly extending temples 16 which are hinged at their forward ends to the edges of the front 12 by means of hinges 18. The hinges, and the adjacent portions of the front end of the temples, preferably are of extremely strong construction so that the rearward portions of the temples adjacent the ear of the wearer are pressed inwardly comfortably against the head. The rearward, head-contacting portions of the temples are designated A in FIGS. 1 and 3. It is the rearward portion A of the temples which may exert painful pressure in the region of the head adjacent the ears if the temples are not properly fitted to the head.

According to the present invention, heat-softenable temples are fitted to the head of a wearer by pressing the heat-softened portions A of the temples against the wearer's head while employing a sheath, such as that shown at 20 in FIG. 2 to sheath the head portion of the temple and so to protect the head of the wearer from pain. The sheaths of the present invention preferably are formed to snuggly enclose the temples, and temples having different stylized shapes may be provided with different sized sheets. The temple 16.1 of FIG. 2, for example, is slender throughout the forward portion of its length but somewhat wider at its rear 16.2. Accordingly, the sheath 20 adapted for the temple 16.1 must be capable of easily passing over the rear 16.2 of the temple but yet must be sufficiently flexible so as to snuggly encase the remainder of the temple, particularly the comparatively slender portion 16.3 joining the rear 16.2 of the temple with the comparatively straight, forward portion of the temple.

Heat-softenable eyeglass temples which can be bent into the correct shape by the method of the present invention may be of various sizes and shapes. In FIG. 2, for example, the temple is comparatively slim whereas in FIG. 3, the temple 16.1' is comparatively heavy at its forward end 16.4' and tapers convergently to a midsection 16.3' which in normal usage would fit approximately above the ear of the wearer and then diverges rearwardly slightly to an end piece 16.2'. The sheath 20' which fits the temple of FIG. 3 accordingly must be somewhat larger, that is, it must have a greater inner diameter than the sheath which fits the temple of FIG. 2.

Although the sheaths employed in the method of the present invention need be only long enough to extend from the rear most end 16.2 (FIG. 2) to a position slightly forward of the ear of the wearer; that is, throughout the length A in FIG. 1, it is desired that the sheath be somewhat longer than this and extend to, or near, the hinge 18. When fairly short sheaths are used to encase the length A of the temple, the danger arises that the sheath may inadvertently be pulled forwardly along the bow from the length A, thereby leaving the end 16.2 of the heated temple exposed.

The sheaths of the present invention are preferably of elastic, supple material so that the sheaths will easily themselves conform to the sides of the head of the wearer adjacent the ear, and so that the sheaths will not wrinkle or become otherwise overlapped in the curved areas of the temple. This is particularly important when the usual narrowness of the intermediate length 16.3, 16.3' (in FIGS. 2 and 3) are considered. These narrow, intermediate areas, or portions of them, may well be heated and bent during an eyeglass fitting operation; it is thus necessary that the sheath which covers these narrow, intermediate areas be snuggly held about the temples at that point. It is also desired that the sheaths have rather low thermal conductivity so that the outer surfaces of the sheaths do not become hot during a fitting operation and thus cause discomfort to the wearer. It will be understood that the heat capacity of plastics in general is rather low, and accordingly little heat need be lost by the heat-softened temples in order to lower the temperature of the temples below the softening point. Although the use of sheaths having high thermal conductivity would undoubtedly enable the temples to cool more quickly during a fitting operation, I have found that the use of sheath materials of low thermal conductivity requires the heated temples to be held in place about the head only for a period of about 30 seconds. This is particularly true when plastic temples having unusually high softening points are employed, as will be described in further detail below.

As materials for the sheaths employed in the present invention, fairly thin, stretchy, cotton knit material of the type used in men's undergarments has given particularly good results. Another material offering good results is polyurethane foamed sheets of perhaps 1/16 inches in thickness. The cotton knit material has been found to be sufficiently flexible as to snuggly encase even those frames having great differences in size along their lengths, such as is shown in FIG. 3.

With reference to FIG. 3, a cotton knit sheath of the invention may be manufactured by cutting a length of cotton knit material to a flattened size of about 1¼ inches in width and about 5½ inches long. The material is then doubled upon itself, stretched lengthwise slightly, and then the mating edges 21 are stitched together along their lengths. The stitching tends to prevent the stitched edges from returning completely to their unstretched condition, and as a result the completed, stitched sheath takes on the bent configuration shown in FIG. 3, which is an appropriate configuration for encasing eyeglass temples having slightly downturned rear portions. Sheaths of polyurethane foam may be manufactured in much the same manner; the folded sections of this material may be stitched or cemented together or otherwise fastened, as desired. It will be desirable in some cases to stitch or otherwise fasten shut the rearmost end 20.1 of a sheath of the invention so that when the sheath is pulled over a heated eyeglass temple, the end of the sheath will come into contact with the end of the heated temples, thereby preventing the sheath from being pulled further on to the temple and exposing the heated, rearmost end 16.2 of the temple itself. In other cases, it will be desirable to permit both ends of the sheath to remain open; this is particularly true when the sheath is of a uniform cross section throughout its length and thus can be fitted from either end onto the heated eyeglass temple. An example of this is shown in FIG. 4, which employs the eyeglass temple of FIG. 2 with a sheath such as that shown in FIG. 3 with both ends open. If stitching, or cementing, or other means of fastening the edges of a precut sheath together are employed, then it is desirable that the resulting seam 21 be positioned at the top of the frame so as not to come into contact with the ears of the wearer during a fitting operation. I have found that the seam 21 provides a good finger hold for fitting the sheaths of the invention over the hot eyeglass temples.

If desired, a length of the seam 21' near the front opening 22 (FIG. 3) of a sheath of the invention may be opened to provide for easier insertion of the end 16.2 of a temple therein, it being remembered that the temple to be inserted in the sheath is sufficiently hot as to be uncomfortable to the touch.

As noted above, the slight bend or curve in the sheaths of the invention may be obtained by stretching lengthwise slightly a folded over section of the sheath material and then stitching the material along its mating edges while maintaining the stretched condition of the sheath. This operation lends itself to ease in the production of many such sheaths by employing rolls of sheath material of the correct width, imparting a slight stretch to the material as it is drawn from the roll, and folded, and continuously stitching the material as set out above. The resulting unbroken length of stitched sheath material can then be conveniently cut transversely into the proper lengths. It will be understood, of course, that the sheaths of the invention may also be made seamless by employing seamless, tubular cotton knit stock or other flexible, insulating, tubular stock and then cutting the stock to the correct length.

Because of their elasticity and flexibility, the sheaths of the invention can be made of a uniform size if desired which will fit substantially all styles of plastic eyeglass temples. For extremely slim temples, or for those which have extremely large cross sections, on the other hand, it may be desirable to provide separate sheaths.

The sheaths of the present invention, and the method for their use in fitting eyeglasses to the head of a wearer, find great utility when used with plastic temples having high softening points. One such plastic, known as "Optyl," is a thermosetting plastic which none-theless exhibits a softening point at about 175° F. Plastics of the thermoplastic variety previously used for eyeglass frames, e.g., polyvinylacetate, ordinarily soften at lower temperatures. The "Optyl" plastic has a three dimensional structure such that when a temple made of this material are heated to the softening point and then bent and cooled, subsequent heating of the temple to the softening point causes the temple to return to its original shape. "Optyl" plastic, and eyeglass frames made from this material, are described in a series of articles published between September, 1971 and January, 1972 in Neues Optikerjournal, Pforzheim, P. O. Box 1166, Federal Republic of Germany. Other plastics of which eyeglass frames can be made, of course, soften at greater or lesser temperatures.

It is very desirable that the sheaths of the present invention be porous. The porosity of the sheaths permits air which becomes heated at the interface of the temple and sheath to pass outwardly through the sheath and thus convey heat away from the temple. Moreover, the porous sheaths also permit hot air from a heater to contact and transfer heat to the enclosed plastic temple, as will be discussed below.

In the method of the present invention, an eyeglass frame of appropriate size is first placed on the head of the wearer so that the person performing the fitting can determine the approximate location in the temple portions of the frames where bending is desired. Thereafter, the glasses are removed and the temples are heated by immersing them in hot sand, placing them in a stream of hot air, etc., so that the temples in the region of the intended bends are raised to a temperature above the softening point of the plastic. The temples are then inserted gently into the sheaths of the present invention so that the sheaths at least cover the heated portions of the temples, whereupon the eyeglasses are again placed upon the head of the wearer and the heated temple portions are pressed gently into conformation against the head. The temples are held in this conformed position until they have cooled below their softening point, and the eyeglasses are then removed from the wearer and the sheaths are stripped from the temples.

Since the temples of the eyeglasses which are heated to points above their softening temperature may be extremely flexible, and hence breakable, it may often be desirable to place the sheaths upon the portions of the temples to be heated before heating the temples. This is particularly true with material such as the "Optyl" plastic referred to above in which the plastic becomes quite flexible at its softening point. The porous nature of the sheath permits a hot stream of air to contact and warm the temple to its softening point, whereupon the temples can be fitted to the head of the wearer. Because of the extremely low heat conductivity and heat capacity of the sheath material, however, the outer surface of the sheath material which contacts the head of the wearer is almost instantaneously reduced in temperature to a comfortable level following heating. By very carefully manipulating the temples while the latter are held in conforming position to the head, the person fitting the temples can tell when the temples themselves have cooled below the softening point.

By "low thermal conductivity" and "low heat capacity," I have reference to thermal conductivities and heat capacites which are substantially less than those of the plastic eyeglass temples with which the sheaths of the present invention are used, i.e., polyvinylacetate. Thermal conductivity and heat capacity approximating those of the cotton knit material described above are appropriate examples. By "heat capacity" as used herein, reference is made to the heat energy necessary to raise a given volume of the sheath material a given number of degrees F., and hence heat capacity is reduced as porosity increases.

Thus, manifestly I have provided a method for closely and accurately fitting the temples of heat-softenable eyeglasses to the head of a wearer so that those portions of the temple which contact the head of the wearer can form to the head very closely and, accordingly, very comfortably. By virtue of my invention, sheaths of flexible, elastic, porous, insulating material of low heat capacity and of low thermal conductivity are provided which, when used to encase the heat-softened temples of eyeglasses, prevent injury or discomfort to the head of the wearer when the temples are conformed to the head and maintained in their conforming shape until the plastic temples have cooled below the softening point.

While I have described a preferred embodiment of the present invention, it should be understood that various changes, adaptations, and modifications may be made therein without departing from the spirit of the invention and the scope of the appended claims.

What is claimed is:
1. A method for forming a sheath for encasing heat-softened eyeglass temples, comprising:
   a. providing a length of knit fabric;
   b. doubling back the fabric upon itself to form a lengthwise fold;
   c. stretching the fabric in the direction of the fold, and while maintaining the fabric in its stretched condition;
   d. fastening the mating edges of the fabric together to form a seam running substantially parallel to the bend
   whereby, when the stretching force is removed, the sheath assumes a bent orientation with the seam at the outer periphery of the bend.
2. A method for fitting a heat-softenable eyeglass temple closely to the head of a wearer, comprising heating the temple to the softening point, and placing the glasses on the head of the wearer with a flexible, elastic insulating sheath provided snuggly on the temple to protect the wearer's head from the heat of the temple; manipulating the sheathed, heat-softened, temple into conformance with the wearer's head; and maintaining the temple in the conformed orientation until it cools to a temperature below the softening point.
3. The method of claim 2 in which the temple is first heated to its softening point, and then the sheath is placed on the temple.
4. The method of claim 2 in which the sheath is porous and is placed on the temple before the latter is heated to its softening point.

* * * * *